Dec. 1, 1964  W. BAUER  3,159,088
MOTION-PICTURE CAMERA
Filed Jan. 27, 1959  2 Sheets-Sheet 1

INVENTOR.
WALTER BAUER
BY
Connolly and Hutz

Dec. 1, 1964    W. BAUER    3,159,088
MOTION-PICTURE CAMERA
Filed Jan. 27, 1959    2 Sheets-Sheet 2
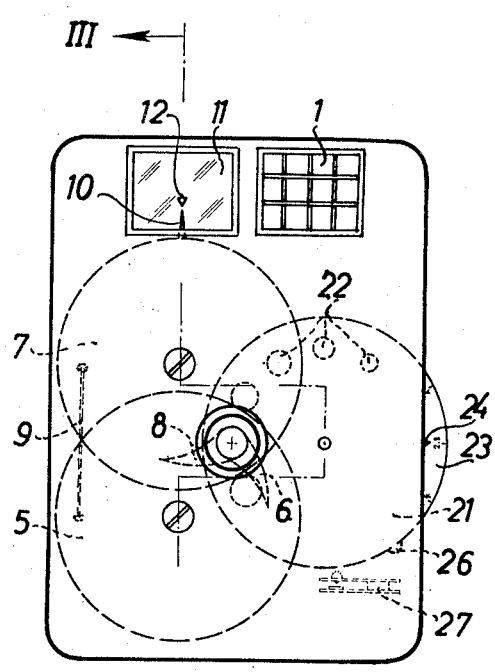
Fig.2
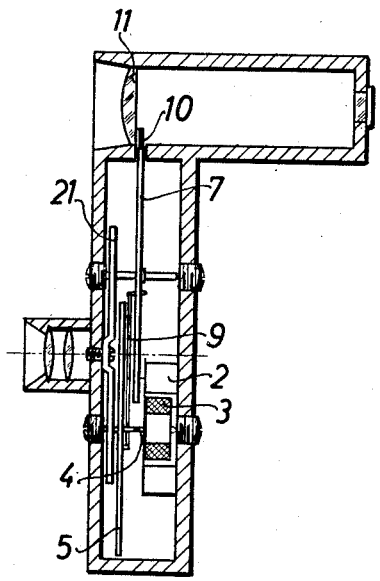
Fig.3
INVENTOR.
WALTER BAUER
BY
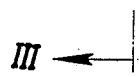
Connolly and Hutz

United States Patent Office 3,159,088
Patented Dec. 1, 1964

3,159,088
MOTION-PICTURE CAMERA
Walter Bauer, Munich, Germany, assignor to Agfa Aktiengesellschaft, Leverkusen-Bayerwerk, Germany, a corporation of Germany
Filed Jan. 27, 1959, Ser. No. 789,388
Claims priority, application Germany, Feb. 15, 1958, A 28,883
9 Claims. (Cl. 95—64)

This invention relates to a motion-picture camera incorporating a light meter, and more particularly relates to such a camera having an aperture which is automatically regulated by a device associated with the light meter.

Cameras of the aforementioned type have heretofore been made to include several apertured elements which are separately mounted upon rotating galvanometer coils. However, these devices are complicated and expensive to manufacture and assemble. Aperture controls have also been constructed including several apertured elements which are interconnected by means of elements such as levers, toothed gears, counterweights and springs with the shaft of a rotating coil. However, all constructions of this type have suffered from the disadvantage that sufficient precision of control cannot be provided. This is at least partially due to the great amount of frictional resistance created by the large number of required bearings which cannot be overcome by the driving forces because of the spring action between the interconnected elements.

An object of this invention is to provide a simple structure for a motion-picture camera having an automatic exposure regulating device which is economical to manufacture and assemble and dependable in operation.

In accordance with this invention, the complications and disadvantages of the aforementioned prior art devices are avoided by mounting an apertured disc upon the shaft of the rotating coil of the exposure measuring device or light meter. This disc is directly coupled with at least one other apertured disc. The driving apertured disc may be advantageously coupled with the driven apertured disc by means of a connecting rod whose ends are rotatably attached to each of the discs. Furthermore, these apertured discs are preferably counterbalanced to facilitate their rotation.

In a preferred embodiment of this invention an indicator is provided, whose movement is regulated by the rotating galvanometer coil of the light-measuring device for indicating when the apertured discs arrive at their end or fully opened position. Preferably, the curve-shaped cutouts upon the apertured discs are constructed and arranged to provide their largest opening over a relatively small angle at the end of the rotational range of the coil. A stationary mark is provided at a point which is reached by the movable indicator when the discs arrive at their limit of travel in the fully opened position to show when sufficient illumination for taking pictures does not exist. This indicator is advantageously made visible in the viewfinder of the camera.

It is also advantageous to connect a variable resistor into the circuit of the exposure measuring device for adjusting it in accordance with the sensitivity of the film being used. Furthermore, in cameras which are adjustable to different picture-taking frequencies, an additional variable resistor is provided to adjust the exposure regulating circuit in accordance with the adjustment of the speed regulator of the film return mechanism.

In accordance with a further aspect of this invention a manually operable supplemental apertured element is mounted in front of the driving and driven apertured discs which provide automatic regulator exposure regulation. This supplemental element may also advantageously be used to automatically control the switching from manual to automatic exposure regulation. For this purpose it may actuate a contact device to close the automatic control circuit at one position and to open this circuit at other positions within the operating range of the supplemental apertured element. Most advantageously, this supplemental apertured element is made in the form of an apertured disc which incorporates a number of differently sized openings. Furthermore, this supplemental apertured disc may be operatively associated with a cam and a follower means which closes the contacts in the circuit of the automatic exposure regulating device when an aperture of largest opening on the supplemental apertured disc is disposed in front of the camera lens.

This present invention is particularly advantageous because of its unusually simple construction. A remarkable decrease in friction over known devices is provided by the saving in the number of bearings necessary, and an exteremely great precision of adjustment is accordingly provided in comparison with known devices of this type.

Novel features and advantages of the present invention will become apparent to one skilled in the art from a reading of the following description in conjunction with the accompanying drawings wherein similar reference characters refer to similar parts and in which:

FIG. 2 is a front view in elevation of a motion-picture camera incorporating the embodiment shown in FIG. 1; and FIG. 3 is a cross-sectional view taken through FIG. 2 along the line III—III.

Figure 1:
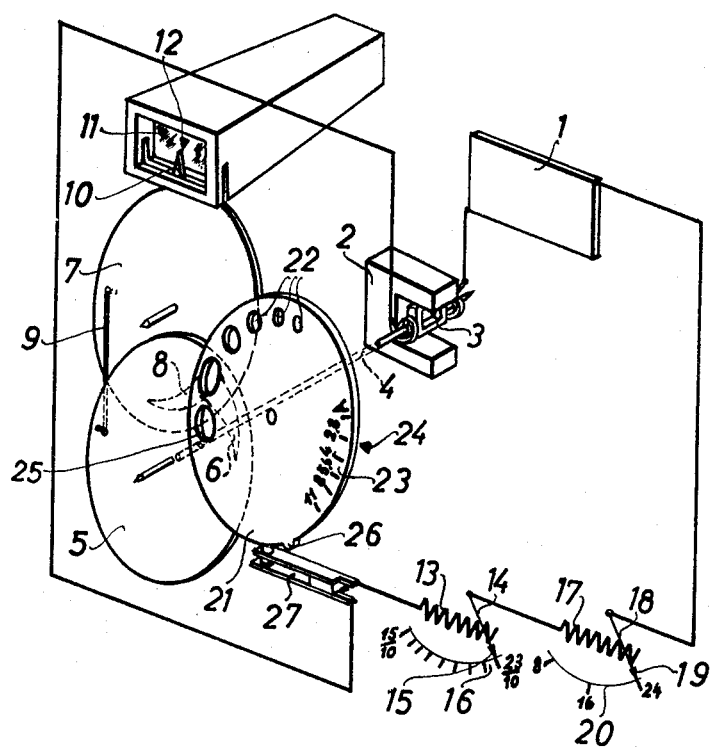
FIG. 1 is a perspective diagrammatic view of an embodiment of this invention associated with a motion-picture camera.

In FIG. 1, is shown an automatic exposure controlling device including a light measuring element 1, which is for example a photoelectric cell and a galvanometer 2 including rotating coil 3. An apertured disc 5 is mounted upon rotating shaft 4 of galvanometer 2. This disc 5 includes a curve-shaped cutout 6. Another apertured disc 7 is disopsed parallel to disc 5 and overlapping a portion of it. Disc 7 includes a correspondingly shaped cutout portion 8. Discs 5 and 7 are movably interconnected with each other, for example, through a connecting rod 9 each of whose ends are rotatably respectively connected to discs 5 and 7.

The curve-shaped cutout portions 6 and 8 in discs 5 and 7 are constructed and arranged to form an aperture opening which always lies in the path of rays passing through the lens of the camera. The resultant aperture opening provided by these cutouts corresponds to the position of the rotating shaft 3 of galvanometer 2 and the corresponding relative positions of discs 5 and 7.

Indicator 10 is, for example, mounted upon a portion of apertured disc 7 in a position making it visible during a portion of its travel in viewfinder 11 of the camera. Indicator 10 provides a means of indicating that picture-taking conditions exist in which it is not assured that adequate exposure of the film is being accomplished in spite of the fact that largest possible aperture opening provided by discs 5 and 7 has been provided. In furtherance of this function, a stationary index mark 12 is arranged, for example, in the viewfinder, and indicator 10 coincides with it when discs 5 and 7 are moved into their extremity of travel which provides their largest aperture. To provide this readily apparent indication of the fact that lighting conditions exist that are not sufficiently bright to properly take motion-pictures, curve-shaped cutouts 6 and 8 are formed to maintain their largest aperture opening over a small angular portion at the end of the range of rotation of rotating coil 3. When movable pointer 10 coincides with stationary index mark 12, it is thereby indicated that the largest attainable aperture opening for picture-taking has been reached, but this still does not admit enough light for taking pictures.

For taking into account varying sensitivity of film, a variable resistor 13 is provided in the circuit of the exposure regulating device for adjusting it in accordance with the light sensitivity of the film being used. A resistance-adjusting means 14 and an indicator 15 which moves over a scale 16 are provided to permit adjustment of resistor 13 in accordance with the values of film sensitivity shown on scale 16. Furthermore, an additional variable resistor 17 is connected in the circuit of the exposure regulating device. Variable resistor 17 is connected with the means for adjusting the speed regulator of the film return mechanism. Adjusting means 18 for variable resistor 17 is associated with an indicating pointer 19 which sweeps over a range of values of picture-taking frequencies displayed upon a scale 20.

A supplemental apertured disc 21 is, for example, mounted in front of apertured discs 5 and 7 of the automatic aperture controlling device. Supplemental apertured disc 21 is manually adjustable and includes a series of openings 22 which are constructed and arranged in accordance with the range of aperture openings to which the camera is to be capable of manual adjustment. Apertures 22 are arranged about the axis of rotation of disc 21 in approximately a half-circle to permit them to be conveniently successively disposed in the path of the picture-taking light rays passing through the lens. Disc 21, for example, includes a scale 23 indicating various standard aperture openings as well as a mark "A" corresponding to automatic aperture control. A stationary index mark 24 is provided opposite scale 23 to permit it to be adjusted as desired.

An additional aperture opening 25 is provided upon supplemental aperture disc 21 to permit optional switching on-and-off of the automatic aperture control. The diameter of aperture 25 corresponds to the largest possible aperture opening provided by the automatic control device. Furthermore, disc 21 includes a camming projection 26 which cooperates with switch 27 incorporating a suitable follower element which is connected in the circuit of the automatic exposure regulating device. Cam 26 is arranged to open the automatic exposure regulator circuit when disc 21 is being used for manual adjustment of the aperture opening.

When supplemental apertured disc 21 is rotated far enough to make mark "A" coincide with stationary index mark 24, aperture 25 is disposed in the path of the picture-taking light rays. At this same time, cam 26 closes switch 27 and completes the circuit for the automatic exposure regulator device. Rotating galvanometer coil 3 is now deviated together with apertured discs 5 and 7 in accordance with the strength of the current emanating from photoelectric cell 1 which accordingly positions them in accordance with the amount of illumination being detected by photoelectric cell 1. An aperture opening is accordingly automatically adjusted by the resultant aperture formed between cutouts 6 and 8 which corresponds to the ideal aperture for the instantaneously existing condition of illumination.

What is claimed is:

1. A control device for automatically regulating the effective aperture of a camera and more particularly a motion-picture camera in accordance with the ambient illumination as indicated by a photoelectric exposure meter incorporating a movable galvanometer element having a shaft, said control device comprising a first apertured disc directly mounted upon said shaft of said movable galvanometer element and a second apertured disc rotatably mounted adjacent said first apertured disc and overlapping a portion thereof in the path of the picture-taking light rays, said first and second apertured discs including cutouts which move across each other to provide a resultant effective aperture opening for said camera, a connecting rod, and rotatable means coupling the ends of said connecting rod to both of said discs to simultaneously rotate them to positions providing an effective aperture corresponding to the ambient illumination being detected by said photoelectric exposure meter.

2. A control device as set forth in claim 1 wherein a manually operable supplemental apertured element being disposed in line with the overlapping positions of said first and second apertured discs, said automatic control device includes a circuit, a switch is connected in said circuit, cam and follower means connect said supplemental apertured means with said switch for closing said switch to complete said circuit when said supplemental apertured means is in a predetermined position, said supplemental apertured means incorporating an aperture opening corresponding to the largest aperture opening of which said camera is capable, and said cam is constructed and arranged for completing said circuit when said additional aperture opening corresponding to the largest aperture opening of said camera is disposed in the path of said picture-taking light rays.

3. A control device as set forth in claim 1 wherein indicating means is operatively connected with said control device for showing when the position of said apertured discs has been reached which provides their full effective aperture opening, said cutouts upon said discs having curve-shaped outlines which are constructed and arranged to maintain their largest effective aperture opening over a small angle adjacent the fully opened end of the range of travel of said movable galvanometer element, a stationary index mark being provided upon said camera with which said indicating means coincides when said apertured discs reach and attempt to exceed their fully opened condition to show that the ambient illumination requires an aperture opening beyond the full aperture opening of which said camera is capable, and said indicating means being constructed and arranged to be visible within the viewfinder of said camera.

4. A control device as set forth in claim 1 wherein a manually operable supplemental apertured element is disposed in line with the overlapping positions of said first and second apertured discs for controlling the effective aperture opening that can be provided by said apertured discs, said supplemental apertured means comprising a disc incorporating a series of openings one of which provides a maximum effective aperture opening for automatic operation and the other openings correspond to standard manually set aperture openings which are less than the full aperture opening of said camera, said automatic control device including a circuit, a switch being connected in said circuit, a cam being mounted upon said supplemental aperture means for closing said switch to complete said circuit when said supplemental apertured means is in a position in line with said aperture opening which provides a maximum effective aperture opening, and said cam opening said switch to inactivate said automatic control device when said openings corresponding to standard manually set aperture openings which are less than the full aperture opening of said camera are disposed in line with said aperture opening and closing said switch to activate said automatic control device when said one of said series of openings providing said maximum effective aperture opening is disposed in front of said aperture opening of said camera.

5. A control device for manually and automatically regulating the effective aperture of a photographic camera comprising an exposure measuring device, an automatic exposure regulating element disposed in line with said aperture and connected to said exposure measuring device for regulating said effective aperture in accordance with the ambient illumination, a manually-operable exposure regulating element also disposed in line with said aperture, said automatic control device including an electrical circuit, a switch being incorporated within said circuit, actuating means connecting said manually-operable exposure regulating element with said switch for governing the operative condition of said automatic exposure regulating element in accordance with the position of said manually-operable regulating element, said manually-operable exposure regulating element being an apertured disc, said disc incorporating a series of openings one of which provides a maximum effective aperture opening for automatic operation and the others providing standard manually set aperture openings which are less than the maximum aperture of said camera, said activating means including cam means mounted upon said apertured disc for closing said switch to complete said circuit when said supplemental apertured means is in a position in line with said aperture opening which provides a maximum effective aperture opening, and said cam means opening said switch to inactivate said automatic control device when said openings corresponding to standard manually set aperture openings which are less than the full aperture opening of said camera are disposed in line with said aperture opening.

6. A control device as set forth in claim 5 wherein indicator means is operatively connected with said automatic exposure regulating element, and said indicator means is constructed and arranged to show when said photoelectric exposure regulating means is inactivated.

7. A control device as set forth in claim 5 wherein said indicator means is a pointer, and said automatic exposure regulating element is mounted adjacent the viewfinder of said camera to permit said pointer to be made visible in said viewfinder.

8. A control device for manually and automatically regulating the effective aperture of a photographic camera comprising an exposure measuring device, an automatic exposure regulating element disposed in line with said aperture and connected to said exposure measuring device for regulating said effective aperture in accordance with the ambient illumination, a manually-operable exposure regulating element also disposed in line with said aperture, said automatic control device including an electrical circuit, a switch being incorporated within said circuit, actuating means connecting said manually-operable exposure regulating element with said switch for governing the operative condition of said automatic exposure regulating element in accordance with the position of said manually-operable regulating element, said manually-operable exposure regulating element being an apertured disc, said disc incorporating a series of openings one of which provides a maximum effective aperture opening for automatic operation and the others providing standard manually set aperture openings which are less than the maximum aperture of said camera, said actuating means including means responsive to rotation of said apertured disc for activating said circuit when said supplemental apertured means is in a position in line with said aperture opening which provides a maximum effective aperture opening, and said actuating means rendering said circuit inoperative when said manually set openings are disposed in line with said aperture opening.

9. A control device for manually and automatically regulating the effective aperture of a photographic camera comprising an exposure measuring device, an automatic exposure regulating element disposed in line with said aperture and connected to said exposure measuring device for regulating said effective aperture in accordance with the ambient illumination, a manually-operable exposure regulating element also disposed in line with said aperture, said automatic control device including an electrical circuit, a switch being incorporated within said circuit, actuating means connecting said manually-operable exposure regulating element with said switch for governing the operative condition of said automatic exposure regulating element in accordance with the position of said manually-operable regulating element, said manually-operable exposure regulating element being adjustable to a number of settings one of which provides a maximum effective aperture opening for automatic operation and the others providing standard manually set aperture openings which are less than the maximum aperture of said camera, said actuating means including means responsive to adjustment of said manually-operable exposure regulating element for activating said circuit when said manually-operable exposure regulating element is adjusted to a setting that provides a maximum effective aperture opening, and said actuating means rendering said circuit inoperative when said manually-operable exposure regulating element is adjusted to said other settings that provide said manually set aperture openings disposed in line with said aperture opening of said camera.

References Cited in the file of this patent
UNITED STATES PATENTS

| | | |
|---|---|---|
| 1,787,797 | Riddell | Jan. 6, 1931 |
| 2,032,633 | Riszdorfer | Mar. 3, 1936 |
| 2,051,061 | Tonnies | Aug. 18, 1936 |
| 2,421,499 | Guedon | June 3, 1947 |
| 2,576,813 | Simons | Nov. 27, 1951 |
| 2,662,457 | Fairbanks | Dec. 15, 1953 |
| 2,838,985 | Burger et al. | June 17, 1958 |
| 2,841,064 | Bagby et al. | July 1, 1958 |

FOREIGN PATENTS

| | | |
|---|---|---|
| 145,699 | Austria | May 11, 1936 |
| 503,901 | Great Britain | Apr. 17, 1939 |